United States Patent [19]

Tominaga

[11] Patent Number: 4,576,451

[45] Date of Patent: Mar. 18, 1986

[54] AIMING TELESCOPE

[75] Inventor: Katsuya Tominaga, Tokyo, Japan

[73] Assignee: Hakko Seiki Kabushiki Kaisha, Japan

[21] Appl. No.: 451,434

[22] Filed: Dec. 20, 1982

[30] Foreign Application Priority Data

Jan. 8, 1982 [JP] Japan .............................. 57-1585[U]

[51] Int. Cl.$^4$ ........................................... G02B 23/10
[52] U.S. Cl. .................................................. 350/566
[58] Field of Search ....................... 350/562, 565–566, 350/172–173; 356/247, 251–252; 33/241, 245–246, 297–298, 247–250, 242

[56] References Cited

U.S. PATENT DOCUMENTS

| | | | |
|---|---|---|---|
| 804,624 | 11/1905 | Saegmuller | 350/566 |
| 1,270,771 | 7/1918 | Bausch | 350/566 |
| 3,294,963 | 12/1966 | Carn | 356/247 |
| 3,362,074 | 1/1968 | Luebkeman et al. | 350/566 |
| 3,514,184 | 5/1970 | Vogl | 350/566 |
| 3,672,782 | 6/1972 | Akin, Jr. | 350/562 |
| 3,782,822 | 1/1974 | Spence | 33/246 |

FOREIGN PATENT DOCUMENTS

| | | | |
|---|---|---|---|
| 16580 | 8/1963 | Japan | 350/566 |
| 1572356 | 7/1980 | United Kingdom | 33/245 |

Primary Examiner—William H. Punter
Attorney, Agent, or Firm—Finnegan, Henderson, Farabow Garrett & Dunner

[57] ABSTRACT

An aiming telescope includes an aiming member made of clear glass which is vapor coated with a small amount of reflective film in a conventional aiming pattern. A lamp or similar illumination device projects light rays onto the aiming film so as to obtain a reflected aiming point in the field of view of the aiming telescope.

9 Claims, 4 Drawing Figures

AIMING TELESCOPE

BACKGROUND OF THE INVENTION

The present invention relates to an aiming telescope to be used in conjunction with a variety of firearms, and, more particularly an aiming telescope that may be used under all lighting conditions.

Avid sportsmen hunt during all hours of the day and night. However, the use of conventional aiming telescopes has been impractical during times of low ambient light, such as the evening and early morning hours, as well as during daylight hours in heavily wooded or shaded areas. During these periods of relative darkness, the visual field through the aiming telescope is too dark to illuminate the reticule and, therefore, the reticule cannot be distinctly recognized. Prior art attempts to use a light source to illuminate the reticule have led to unacceptably complicated and expensive constructions.

OBJECTS AND SUMMARY OF THE INVENTION

It is an object of the present invention to improve an aiming telescope by illuminating the reticule.

Another object of the invention is an aiming telescope of simple and inexpensive construction which can be used in environments of low ambient light.

These and other objects are accomplished by an aiming telescope including an ocular lens system for providing a field of view, the telescope comprising means for providing an aiming pattern in the field of view and means for illuminating the aiming pattern to render the aiming pattern visible within the field of view regardless of the luminance level of ambient light.

The objects and advantages of the invention may be realized and obtained by the means of the instrumentalities and combinations particularly pointed out in the appended claims. The accompanying drawings which are incorporated in and constitute a part of this specification, illustrate one embodiment of the invention, and, together with the description, serve to explain the principles of the invention.

DESCRIPTION OF THE PREFERRED EMBODIMENT

According to the features of the present invention, a light ray emitted from a contained light source is successively projected through frosted glass, a colored filter, such as a red filter, and a glass block onto a strip of reflective film shaped in any conventional aiming pattern. The light ray thus projected is reflected in the direction of the viewer and guided by an ocular lens system into the viewer's eye. As a result, regardless of the luminance level of ambient light, the aiming pattern formed by the reflective film is seen as a mark the color of the filter.

Reference will now be made in detail to the present preferred embodiment, an example of which is illustrated in the accompanying drawings.

Figure 1:
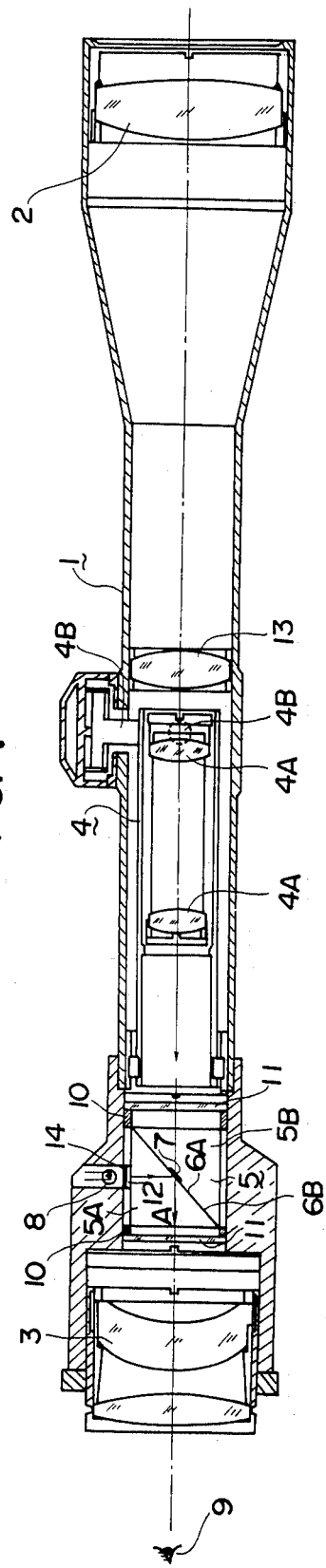
FIG. 1 is a longitudinal section depicting the aiming telescope according to the present invention.

Referring now to the drawings, particularly to FIG. 1, there is shown an aiming telescope 1 of a certain magnification comprising an objective lens system 2 on the subject side of the telescope 1, an ocular lens system 3 on the user side of the telescope, and an aiming adjustment mechanism 4.

The aiming adjustment mechanism 4 preferably comprises an optical system including two adjustment lens 4A as well as a knob 4B for aiming adjustment which allows the adjustment lens 4A to be adjustably positioned relative to a pair of glass blocks 5 having a reticle 7. The position of optical axis is varied by laterally positioning the adjustment lens 4A as a pivotable unit. The telescope further includes means for providing an aiming pattern in the field of view and means for illuminating the aiming pattern to render the aiming pattern visible within the field of view regardless of the luminance level of ambient light.

As embodied herein, the providing means comprises a glass block 5 consisting of two glass members or prisms 5A, and 5B and having a reflective aiming film 7 formed on a face of the glass block 5B at a position within the field of view of the telescope.

Figure 2:
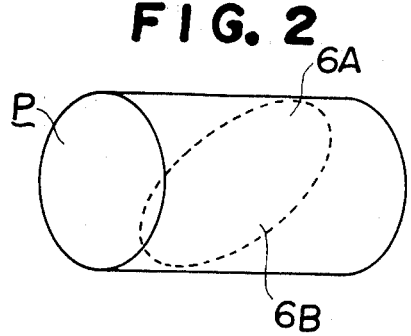
FIG. 2 is a perspective view showing a cylindrical mass of glass material from which glass block elements used in the aiming telescope of FIG. 1, may be manufactured.

The initial step in constructing the glass block 5 is the production of the two glass members 5A, 5B of substantially clear glass with complementary faces 6A, 6B cut at an angle of 45°. These glass members 5A, 5B may, for example, be obtained from a cylindrical mass cut or sliced as shown in phantom in FIG. 2. Following production, the glass members 5A, 5B are joined together to form the glass block 5. A suitable adhesive may be used to cement the glass pieces 5A and 5B together at their complementary faces 6A and 6B, respectively.

Figure 4:
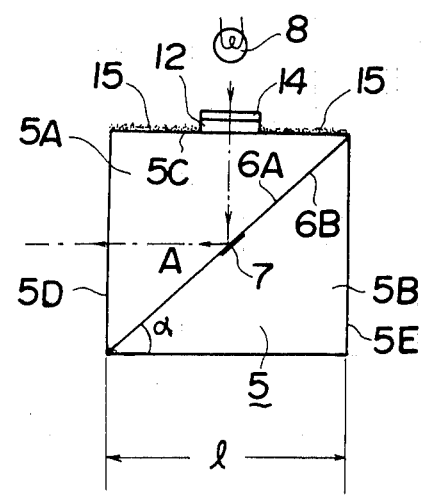
FIG. 4 is an enlarged view of the reticule illuminating portion of the aiming telescope of FIG. 1.

Referring to FIG. 4, it will be noted that the face 6A of the glass piece 5A and the face 6B of the glass piece 5B are polished. The face 6B is also coated or provided with a reflective film 7 substantially at its center point in the shape of a suitable aiming pattern. The film 7 may be provided by vapor desposition. The aiming pattern serves as the aiming point for shooting and conventionally takes the shape of either a single dot, a cross, a Y, an X, or a pair of horizontally juxtaposed line segments with a dot interposed at the point where the two lines cross.

Figure 3:
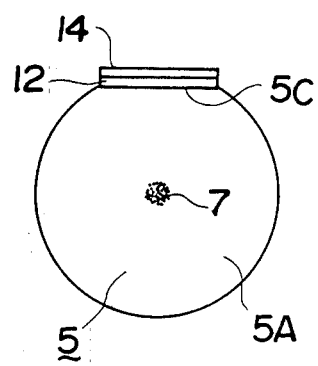
FIG. 3 is a front view of the aiming telescope of FIG. 1.

One embodiment of the aiming pattern formed by the reflective film 7 is shown in FIG. 3 to be in the form of a single dot having a diameter of approximately 0.15 mm to 0.20 mm.

The top surface 5C of the glass member 5A is cut horizontally with respect to the vertical axis. The top surface 5C is polished and covered with a colored filter 12, such as red. A frosted glass piece 14 is applied on top of the colored filter 12.

As embodied herein, the illuminating means comprises a light source 8, such as a small, battery-powered lamp, which emits light rays that are transmitted through the frosted glass piece 14, the filter 12, and the glass block 5A and projected onto the reflective aiming film 7 of glass member 5B. The light rays projected onto the reflective film 7 are guided by the ocular lens system 3 into the eye 9 and cause a colored aiming pattern to be visible within the field of view.

During daylight hours, use of the light source 8 is unnecessary and the reflective film 7 appears to the eye as a dark mark which also serves as an aiming point.

The light source 8 is not limited to a conventional lamp, but may be replaced by any suitable equivalent such as a luminous diode.

The vertical surface 5E of glass member 5B and the vertical surface 5D of glass member 5A are spaced apart at a predetermined distance such that when dust or dirt is deposited on the surfaces 5D and 5E, such dust or dirt will not be visible from the ocular lens system 3.

An annular spacer 10 fixes the aiming member 5 at a predetermined position. A dust-proof glass plate 11 is provided adjacent the annular spacer 10. Finally, a magnifying lens 13 is inserted downstream between the optical system 4A and the objective lens system 2 as depicted in FIG. 1.

The invention has been shown and described with reference to a specific embodiment, however, it should be noted that the invention is in no way limited to the details of the illustrated structures; changes and modifications may be made without departing from the scope of the invention as set forth in the appended claims.

What is claimed is:

1. An aiming telescope having an optical axis and comprising a pair of glass blocks having complementary surfaces cut at an angle of 45° and joined together;
   each glass block having an end surface perpendicular to the optical axis and parallel to each other;
   a reflective film having the shape of a reticle and centrally provided on at least one of said cut surfaces midway between said end surfaces to form an aiming pattern;
   said glass blocks being cemented together along said complementary surfaces; and
   an illuminating means positioned so that light rays are transmitted through one of the glass blocks and reflected off the reflective film in the shape of a reticle to be visible through an occular system by a user and wherein the illuminating means is positioned so that the light rays incident to the reflective film are perpendicular to the optical axis.

2. An aiming telescope according to claim 1, wherein said reflective film defines an aiming pattern in the form of a single dot.

3. An aiming telescope according to claim 1, wherein said illuminating means comprises a lamp for projecting light on said reflective film.

4. An aiming telescope according to claim 1 wherein said illuminating means comprises a light emitting diode for projecting light on said reflective film.

5. An aiming telescope as claimed in claim 1 further comprising a colored filter positioned between the illuminating means and the reflective film so that the light reflected by the reflective film is the color of the filter whereby the aiming pattern is the color of the filter.

6. An aiming telescope having an optical axis, a user side and a subject side opposite the user side comprising:
   a single pair of glass blocks having complementary surfaces cut at an angle of 45° and joined together;
   a reflective film having the shape of a reticle and centrally provided on at least one of said cut surfaces;
   illuminating means positioned for transmitting light rays through one of the glass blocks and off the reflective film in the shape of a reticle to be visible through an occular system by a user wherein the illuminating means is positioned so that the light rays incident to the reflective film are perpendicular to the optical axis;
   occular lens means positioned on the user side of the single pair of glass blocks; and
   objective lens means positioned on the subject side of the single pair of glass blocks.

7. An aiming telescope as claimed in claim 6 further comprising aiming adjustment means including at least one adjustment lens positioned between the objective lens means and the single pair of glass blocks for adjustable positioning relative thereto and for varying the position of the optical axis.

8. An aiming telescope as claimed in claim 7 wherein the aiming adjustment means includes means to laterally position the adjustment lens.

9. An aiming telescope as claimed in claim 7 wherein the aiming adjustment means includes a pivotable unit of at least two spaced relatively fixed adjustment lens.

* * * * *